US011124268B2

(12) United States Patent
Terashima et al.

(10) Patent No.: US 11,124,268 B2
(45) Date of Patent: Sep. 21, 2021

(54) HUMAN-POWERED VEHICLE CONTROL DEVICE

(71) Applicant: SHIMANO Inc., Sakai (JP)

(72) Inventors: Keiji Terashima, Sakai (JP); Taketoshi Satou, Sakai (JP)

(73) Assignee: Shimano Inc., Osaka (JP)

( * ) Notice: Subject to any disclaimer, the term of this patent is extended or adjusted under 35 U.S.C. 154(b) by 166 days.

(21) Appl. No.: 16/376,097

(22) Filed: Apr. 5, 2019

(65) Prior Publication Data

US 2019/0308690 A1    Oct. 10, 2019

(30) Foreign Application Priority Data

Apr. 9, 2018 (JP) .............................. JP2018-074899

(51) Int. Cl.
*B62M 6/50* (2010.01)
*B62M 25/08* (2006.01)
*B62M 6/55* (2010.01)

(52) U.S. Cl.
CPC ................ *B62M 6/50* (2013.01); *B62M 6/55* (2013.01); *B62M 25/08* (2013.01)

(58) Field of Classification Search
CPC .................................. B62M 6/50; B62M 6/55
See application file for complete search history.

(56) References Cited

U.S. PATENT DOCUMENTS

| 6,446,745 B1* | 9/2002 | Lee ........................... B60L 1/14 180/206.2 |
| 2013/0054066 A1 | 2/2013 | Watarai |
| 2017/0151997 A1* | 6/2017 | Repoulias .............. B62M 25/08 |
| 2017/0217538 A1* | 8/2017 | Yamamoto ........... B62M 11/145 |
| 2018/0029666 A1* | 2/2018 | Shahana .................. B62M 6/50 |
| 2019/0315433 A1* | 10/2019 | Hasumi ................... B60L 50/20 |

FOREIGN PATENT DOCUMENTS

| CN | 1247144 A | 3/2000 |
| CN | 1530284 A | 9/2004 |
| CN | 105564581 A | 5/2016 |
| CN | 107298151 A | 10/2017 |
| CN | 107662689 A | 2/2018 |
| JP | 2004268854 A | 9/2004 |
| JP | 2013047083 A | 3/2013 |

* cited by examiner

*Primary Examiner* — Mathew Franklin Gordon
(74) *Attorney, Agent, or Firm* — Alleman Hall Creasman & Tuttle LLP (57) ABSTRACT

A human-powered vehicle control device includes a controller that controls a motor assisting propulsion of a human-powered vehicle. The controller controls the motor in a first control state in which an assist force produced by the motor becomes less than or equal to a first predetermined value in a case in which an inclination angle related to the human-powered vehicle is greater than or equal to a first predetermined angle and a request for operating a transmission provided on the human-powered vehicle is received.

26 Claims, 7 Drawing Sheets

HUMAN-POWERED VEHICLE CONTROL DEVICE

BACKGROUND ART

The present disclosure relates to a human-powered vehicle control device.

Patent document 1 discloses an example of a human-powered vehicle control device that controls a motor assisting propulsion of a human-powered vehicle. This control device temporarily stops or reduces assist force produced by the motor in a case there is a request for operating a transmission provided in the human-powered vehicle.

Patent Document 1: Japanese Laid-Open Patent Publication No. 2004-268854

SUMMARY

It is preferred that the assist force be controlled in accordance with a traveling situation of the human-powered vehicle.

A human-powered vehicle control device in accordance with a first aspect of the present disclosure comprises a controller that controls a motor assisting propulsion of a human-powered vehicle. The controller controls the motor in a first control state in which an assist force produced by the motor becomes less than or equal to a first predetermined value in a case in which an inclination angle related to the human-powered vehicle is greater than or equal to a first predetermined angle and a request for operating a transmission provided on the human-powered vehicle is received.

In accordance with the human-powered vehicle control device of the first aspect, the assist force of the motor is controlled taking into consideration the inclination angle related to the human-powered vehicle. Thus, the assist force is suitably controlled.

In accordance with a second aspect of the present disclosure, in the human-powered vehicle control device according to the first aspect, the controller is configured to control the motor in the first control state so that the assist force produced by the motor is in a first predetermined range that is greater than 0 Nm.

In accordance with the human-powered vehicle control device of the second aspect, sudden changes in the assist force in the first control state are limited.

In accordance with a third aspect of the present disclosure, the human-powered vehicle control device according to the second aspect is configured so that, the controller controls the motor in the first control state in at least one of a state in which the motor is assisting the human-powered vehicle and a state in which the human-powered vehicle is traveling.

In accordance with the human-powered vehicle control device of the third aspect, the assist force of the motor is controlled taking into consideration the inclination angle related to the human-powered vehicle. Thus, the assist force is suitably controlled.

In accordance with a fourth aspect of the present disclosure, the human-powered vehicle control device according to the second or third aspect is configured so that the first predetermined range is greater than 0 Nm and less than or equal to 25 Nm.

In accordance with the human-powered vehicle control device of the fourth aspect, sudden changes in the assist force in the first control state are limited.

In accordance with a fifth aspect of the present disclosure, the human-powered vehicle control device according to any one of the first to fourth aspects further comprises an inclination detection unit that detects the inclination angle related to the human-powered vehicle.

In accordance with the human-powered vehicle control device of the fifth aspect, the inclination angle related to the human-powered vehicle is easily detected.

In accordance with a sixth aspect of the present disclosure, the human-powered vehicle control device according to the fifth aspect is configured so that the inclination detection unit includes an inclination sensor that is attachable to the human-powered vehicle.

In accordance with the human-powered vehicle control device of the sixth aspect, the inclination angle related to the human-powered vehicle is easily detected.

In accordance with a seventh aspect of the present disclosure, the human-powered vehicle control device according to the fifth or sixth aspect is configured so that the inclination detection unit detects the inclination angle related to the human-powered vehicle based on position information of the human-powered vehicle and map information.

In accordance with the human-powered vehicle control device of the seventh aspect, the inclination angle related to the human-powered vehicle is suitably detected.

In accordance with an eighth aspect of the present disclosure, the human-powered vehicle control device according to any one of the first to seventh aspects is configured so that the request for operating the transmission provided on the human-powered vehicle includes a request for decreasing a first rotation ratio of a rotation speed of a drive wheel to a rotation speed of a crank of the human-powered vehicle.

In accordance with the human-powered vehicle control device of the eighth aspect, the assist force is suitably controlled in a case in which a request for decreasing the first rotation ratio is received.

In accordance with a ninth aspect of the present disclosure, in the human-powered vehicle control device according to any one of the first to eighth aspects, the controller is configured to control the motor in a second control state in which the assist force produced by the motor to a human driving force becomes a first assist ratio.

In accordance with the human-powered vehicle control device of the ninth aspect, the assist force of the motor is controlled in a versatile manner.

In accordance with a tenth aspect of the present disclosure, the human-powered vehicle control device according to the ninth aspect is configured so that, in a case in which the motor is controlled in the first control state and a first predetermined condition is satisfied, the controller changes a control state of the motor to the second control state.

In accordance with the human-powered vehicle control device of the tenth aspect, the control state of the motor is suitably switched from the first control state to the second control state.

In accordance with an eleventh aspect of the present disclosure, the human-powered vehicle control device according to the tenth aspect is configured so that the first predetermined condition is satisfied in a case in which a rotation angle of a crank of the human-powered vehicle is included in a predetermined angular range.

In accordance with the human-powered vehicle control device of the eleventh aspect, the first predetermined condition is determined based on the rotation angle of the crank. Thus, the first predetermined condition is easily determined.

In accordance with a twelfth aspect of the present disclosure, the human-powered vehicle control device according to the eleventh aspect is configured so that the predetermined angular range excludes a top dead center and a bottom dead center of the crank.

In accordance with the human-powered vehicle control device of the twelfth aspect, the control state of the motor is switched from the first control state to the second control state in a case in which the rotation angle of the crank is neither the top dead center nor the bottom dead center.

In accordance with a thirteenth aspect of the present disclosure, the human-powered vehicle control device according to any one of the tenth to twelfth aspect is configured so that the first predetermined condition is related to time.

In accordance with the human-powered vehicle control device of the thirteenth aspect, the control state of the motor is switched from the first control state to the second control state based on time.

In accordance with a fourteenth aspect of the present disclosure, the human-powered vehicle control device according to any one of the tenth to thirteenth aspects is configured so that the first predetermined condition is satisfied in a case in which operation of the transmission is completed.

In accordance with the human-powered vehicle control device of the fourteenth aspect, the control state of the motor is switched from the first control state to the second control state in a case in which the operation of the transmission is completed.

In accordance with a fifteenth aspect of the present disclosure, the human-powered vehicle control device according to any one of the first to fourteenth aspects is configured so that the controller operates the transmission in accordance with the request for operating the transmission in a case in which the assist force produced by the motor is less than or equal to the first predetermined value.

In accordance with the human-powered vehicle control device of the fifteenth aspect, the transmission is suitably operated.

A human-powered vehicle control device in accordance with a sixteenth aspect of the present disclosure comprises a controller that controls a motor assisting propulsion of a human-powered vehicle. In at least one of a state in which the motor is assisting the human-powered vehicle and a state in which the human-powered vehicle is traveling, the controller controls the motor so that an assist force produced by the motor is in a first predetermined range that is greater than 0 Nm and less than or equal to 25 Nm in a case in which a request for operating a transmission provided on the human-powered vehicle is received.

In accordance with the human-powered vehicle control device of the sixteenth aspect, the assist force is suitably controlled in a case in which a request for operating the transmission is received.

A human-powered vehicle control device in accordance with a seventeenth aspect of the present disclosure comprises a controller that controls a motor assisting propulsion of a human-powered vehicle. The controller controls the motor to increase an assist force produced by the motor in a case in which a request for increasing a second rotation ratio of a rotation speed of a drive wheel to a rotation speed of a crank of the human-powered vehicle is received.

In accordance with the human-powered vehicle control device of the seventeenth aspect, the load on the rider is suitably reduced.

A human-powered vehicle control device in accordance with an eighteenth aspect of the present disclosure comprises a controller that controls a motor assisting propulsion of a human-powered vehicle. In at least one of a state in which the motor is assisting propulsion of the human-powered vehicle, a state in which the human-powered vehicle is traveling, and a state in which an acceleration of the human-powered vehicle is greater than or equal to predetermined acceleration, the controller controls the motor in a third control state that increases an assist force produced by the motor in a case in which an inclination angle related to the human-powered vehicle is less than a second predetermined angle and a request for increasing a third rotation ratio of a rotation speed of a drive wheel to a rotation speed of a crank of the human-powered vehicle is received.

In accordance with the human-powered vehicle control device of the eighteenth aspect, the assist force of the motor is suitably controlled in a case in which there is an acceleration request from the rider.

In accordance with a nineteenth aspect of the present disclosure, the human-powered vehicle control device according to the eighteenth aspect is configured so that the state in which the human-powered vehicle is traveling includes a state in which the motor is not assisting propulsion of the human-powered vehicle.

In accordance with the human-powered vehicle control device of the nineteenth aspect, the assist force of the motor is suitably controlled in a case in which there is an acceleration request from the rider in a state in which propulsion of the human-powered vehicle is not being assisted.

In accordance with a twentieth aspect of the present disclosure, in the human-powered vehicle control device according to the eighteenth or nineteenth aspect, the controller is configured to control the motor in a fourth control state so that the assist force produced by the motor to human driving force becomes a second assist ratio.

In accordance with the human-powered vehicle control device of the twentieth aspect, the assist force of the motor is controlled in a versatile manner.

In accordance with a twenty-first aspect of the present disclosure, the human-powered vehicle control device according to the twentieth aspect is configured so that the controller controls the motor in the third control state so that the assist force produced by the motor to the human driving force becomes a third assist ratio that is larger than the second assist ratio.

In accordance with the human-powered vehicle control device of the twenty-first aspect, the load on the rider is suitably reduced.

In accordance with a twenty-second aspect of the present disclosure, the human-powered vehicle control device according to the twentieth aspect is configured so that the controller controls the motor in the third control state to generate a first assist force by adding a predetermined assist force to an assist force obtaining a third assist ratio that is larger than the second assist ratio with respect to the human driving force.

In accordance with the human-powered vehicle control device of the twenty-second aspect, the load on the rider is suitably reduced.

In accordance with a twenty-third aspect of the present disclosure, the human-powered vehicle control device according to the twentieth aspect is configured so that the controller controls the motor in the third control state to generate a second assist force by adding a predetermined assist force to the second assist ratio with respect to the human driving force.

In accordance with the human-powered vehicle control device of the twenty-third aspect, the load on the rider is suitably reduced.

In accordance with a twenty-fourth aspect of the present disclosure, the human-powered vehicle control device according to the twenty-second or twenty-third aspect is configured so that the predetermined assist force is changed in accordance with at least one of the third rotation ratio and a change amount of the third rotation ratio.

In accordance with the human-powered vehicle control device of the twenty-fourth aspect, the predetermined assist force is suitably set.

In accordance with a twenty-fifth aspect of the present disclosure, the human-powered vehicle control device according to the twenty-fourth aspect is configured so that the predetermined assist force increases as the change amount of the third rotation ratio increases.

In accordance with the human-powered vehicle control device of the twenty-fifth aspect, the load on the rider is suitably reduced.

In accordance with a twenty-sixth aspect of the present disclosure, the human-powered vehicle control device according to any one of the twentieth to twenty-fifth aspects is configured so that the controller changes a control state of the motor to the fourth control state in a case in which a second predetermined condition is satisfied after changing the control state of the motor to the third control state.

In accordance with the human-powered vehicle control device of the twenty-sixth aspect, the control state of the motor is suitably switched from the third control state to the fourth control state in a case in which the second predetermined condition is satisfied.

In accordance with a twenty-seventh aspect of the present disclosure, the human-powered vehicle control device according to the twenty-sixth aspect is configured so that the second predetermined condition includes one of a rotation speed of a crank of the human-powered vehicle and a rotation angle of the crank.

In accordance with the human-powered vehicle control device of the twenty-seventh aspect, the control state of the motor is suitably switched from the third control state to the fourth control state based on the rotation speed of the crank and the rotation angle of the crank.

In accordance with a twenty-eighth aspect of the present disclosure, the human-powered vehicle control device according to the twenty-seventh aspect is configured so that the second predetermined condition is satisfied in a case in which the rotation speed of the crank becomes greater than or equal to 55 rpm.

In accordance with the human-powered vehicle control device of the twenty-eighth aspect, the assist force is suitably lowered in a case in which the rotation speed of the crank is greater than or equal to 55 rpm.

In accordance with a twenty-ninth aspect of the present disclosure, the human-powered vehicle control device according to any one of the eighteenth to twenty-eighth aspects is configured so that the controller prohibits control of the motor in the third control state in a case in which the rotation speed of the crank of the human-powered vehicle is greater than or equal to a predetermined value.

In accordance with the human-powered vehicle control device of the twenty-ninth aspect, the assist force is not increased in a case in which the rotation speed of the crank is greater than or equal to a predetermined value.

In accordance with a thirtieth aspect of the present disclosure, the human-powered vehicle control device according to any one of the eighteenth to twenty-ninth aspects is configured so that the controller starts controlling the motor in the third control state immediately before changing the third rotation ratio, when changing the third rotation ratio, or immediately after changing the third rotation ratio.

In accordance with the human-powered vehicle control device of the thirtieth aspect, the transmission is suitably operated.

In accordance with a thirty-first aspect of the present disclosure, the human-powered vehicle control device according to any one of the eighteenth to thirtieth aspects is configured so that the controller increases the assist force in a stepped manner in the third control state at timings including at least two of immediately before changing the third rotation ratio, when changing the third rotation ratio, and immediately after changing the third rotation ratio.

In accordance with the human-powered vehicle control device of the thirty-first aspect, the assist force is suitably increased.

In accordance with the human-powered vehicle control device related to the present disclosure, the assist force is suitably controlled in accordance with the traveling situation of the human-powered vehicle.

EMBODIMENTS OF THE DISCLOSURE

First Embodiment

Figure 1:
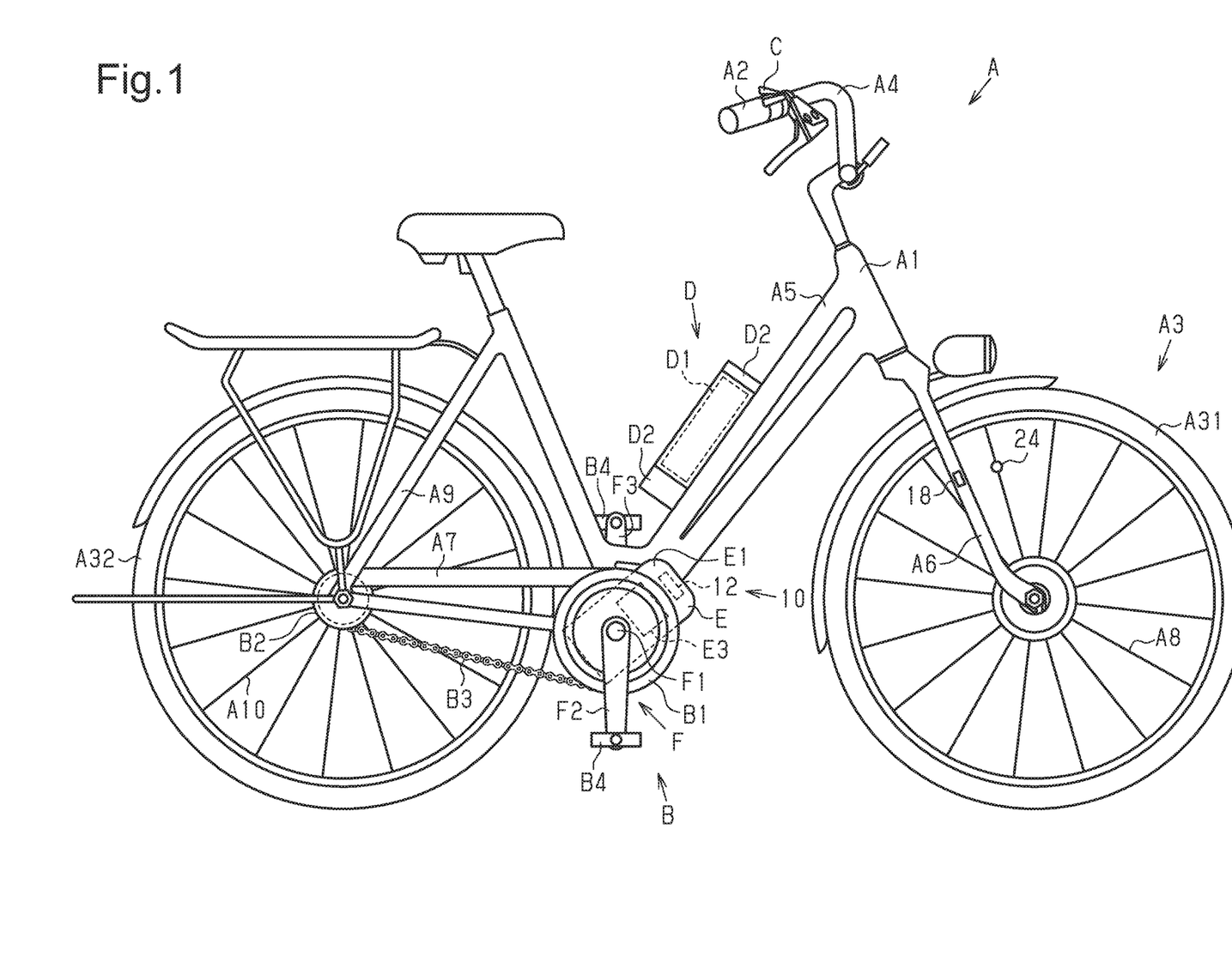
FIG. 1 is a side view of a human-powered vehicle including a human-powered vehicle control device in accordance with a first embodiment.

With reference to FIG. 1, a human-powered vehicle A installed on a human-powered vehicle control device 10 will now be described. A human-powered vehicle refers to a vehicle that at least partially uses human force as a prime mover for traveling and includes vehicles that assist human force with electric power. Human-powered vehicles do not include vehicles that use only a prime mover other than human force. In particular, human-powered vehicles do not include vehicles that use only an internal combustion engine as the prime mover. A human-powered vehicle is a compact light vehicle that does not require a license for driving on a public road. The illustrated human-powered vehicle A is a bicycle (e-bike) including an assist device E3 that assists the propulsion of the human-powered vehicle A using electric energy. Specifically, the illustrated human-powered vehicle A is a city cycle. The type of human-powered vehicle A can be a road bike, a mountain bike, or a cross bike. Hereinafter, the human-powered vehicle control device 10 will simply be referred to as the control device 10.

The human-powered vehicle A includes a main body A1, a handlebar A2, a drive wheel A3, a handle stem A4, a driving mechanism B, an operation unit C, a battery unit D, a drive unit E, and the control device 10. The main body A1 includes a frame A5. The drive wheel A3 includes a front wheel A31 and a rear wheel A32.

The driving mechanism B transmits the human driving force to the rear wheel A32. The driving mechanism B includes a front sprocket B1, a rear sprocket B2, a chain B3, a crank mechanism F, and a pair of pedals B4. The driving mechanism B can be of, for example, a belt drive type or a shaft drive type.

The crank mechanism F includes a crank F1, a right crank arm F2, and a left crank arm F3. The crank F1 is rotatably supported by a bottom bracket (not shown) provided on the frame A5. The right crank arm F2 and the left crank arm F3 are connected to the crank F1. One of the two pedals B4 is rotatably supported by the right crank arm F2. The other one of the two pedals B4 is rotatably supported by the left crank arm F3.

The front sprocket B1 is coupled to the crank F1. A rotation axis of the crank F1 coincides with a rotation axis of the front sprocket B1. The front sprocket B1 can be coupled to the crank F1 by any structure. A one-way clutch (not shown) is provided between the crank F1 and the front sprocket B1. The one-way clutch transmits the rotation of the crank F1 to the front sprocket B1 in a case in which the rotation speed of the forward rotating crank F1 is higher than the rotation speed of the front sprocket B1. The one-way clutch can be omitted.

The rear sprocket B2 is supported by a hub of the rear wheel A32. The chain B3 is wound around the front sprocket B1 and the rear sprocket B2. In a case in which the crank F1 and the front sprocket B1 are rotated forward by the human driving force applied to the pair of pedals B4, the rear wheel A32 is rotated forward by the human driving force transmitted via the chain B3 and the rear sprocket B2.

Figure 2:
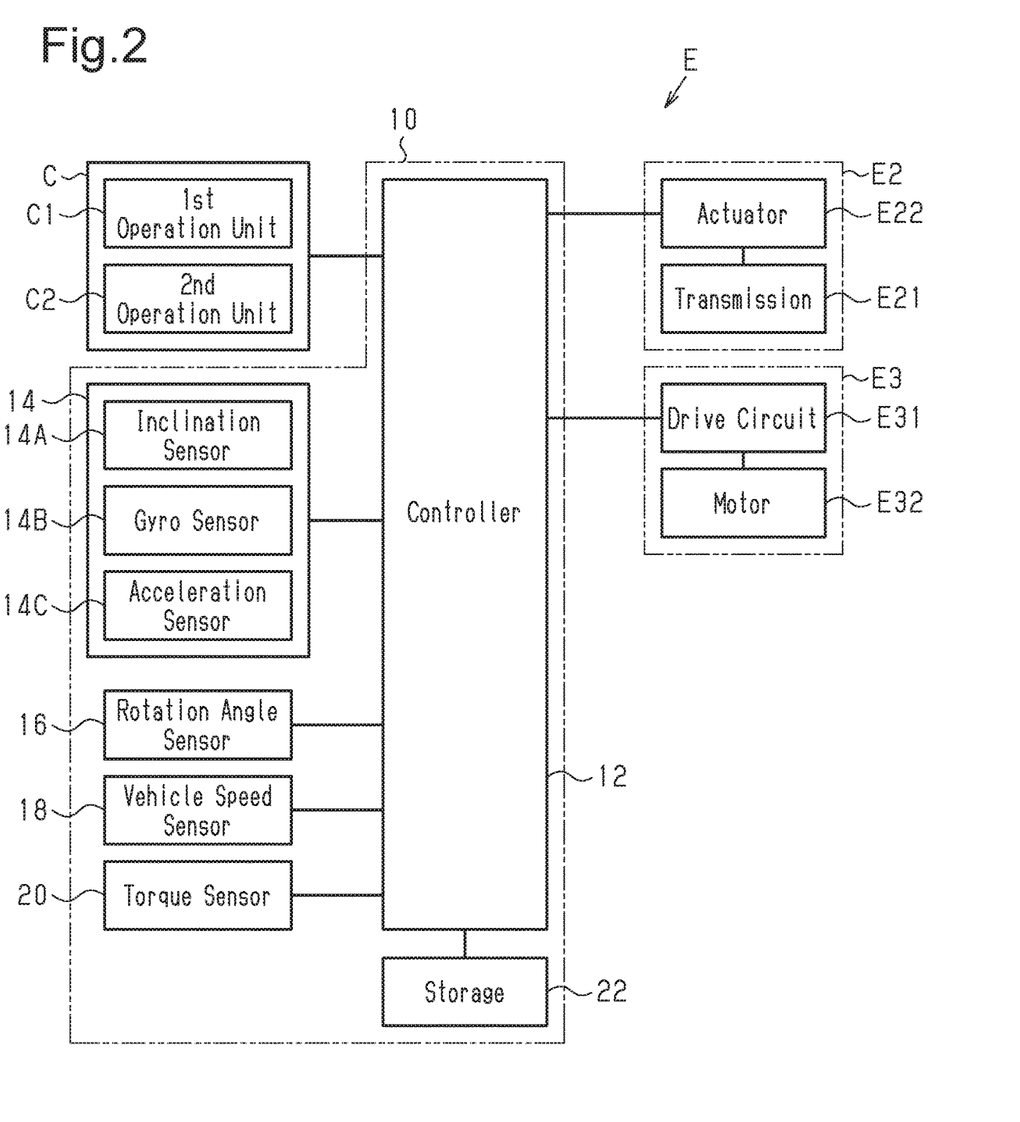
FIG. 2 is a block diagram of the control device of FIG. 1.

The operation unit C is attached to the handlebar A2. The operation unit C is connected to a controller 12 (refer to FIG. 2) of the control device 10 to communicate with the controller 12 through wired or wireless connection. As shown in FIG. 2, the operation unit C includes a first operation unit C1 and a second operation unit C2. In a case in which the first operation unit C1 is operated by an operator, the operation unit C transmits a signal (hereinafter referred to as "the shift-down signal") for decreasing a ratio RA of the rotation speed of the drive wheel A3 to the rotation speed of the crank F1 to the controller 12. In a case in which the second operation unit C2 is operated by the operator, the operation unit C transmits a signal (hereinafter referred to as "the shift-up signal") for increasing the ratio RA to the controller 12.

The battery unit D includes a battery D1 and a battery holder D2 for detachably attaching the battery D1 to the frame A5. The battery D1 includes one or more battery cells. The battery D1 is formed by a rechargeable battery. The battery D1 is electrically connected to a motor E32 (refer to FIG. 2) of the drive unit E. The battery D1 supplies electric power to the motor E32.

The drive unit E includes a housing E1, a transmission device E2 (refer to FIG. 2), and an assist device E3. The housing E1 is provided on the frame A5. The transmission device E2 (refer to FIG. 2) and the assist device E3 are housed in the housing E1.

As shown in FIG. 2, the transmission device E2 includes a transmission E21 and an actuator E22. The transmission E21 changes the speed of the rotation input to the crank F1 (refer to FIG. 1) and transmits the rotation to the front sprocket B1 (refer to FIG. 1). The transmission device E2 changes the ratio RA. An example of the transmission E21 is an internal transmission device including a planetary gear mechanism (not shown). In the transmission device E2, the ratio RA is changed in a stepped manner by driving the actuator E22 to change the mated state of the gears in the planetary gear mechanism of the transmission E21. The transmission E21 can be an external transmission device.

The assist device E3 includes a drive circuit E31 and a motor E32. The drive circuit E31 controls the electric power supplied from the battery D1 to the motor E32. The motor E32 assists propulsion of the human-powered vehicle A. The motor E32 is formed by an electric motor. The motor E32 is coupled to the crank F1 or the transmission E21. Preferably, a one-way clutch (not shown) is provided in a power transmission path between the motor E32 and the crank F1 or the transmission E21 so that the motor E32 is not rotated by the rotational force of the crank F1.

As shown in FIG. 2, the control device 10 includes the controller 12. The controller 12 controls the motor E32 that assists propulsion of the human-powered vehicle A. Preferably, the control device 10 further includes an inclination detection unit 14. Therefore, an inclination angle θA is easily detected. Preferably, the control device 10 further includes a rotation angle sensor 16, a vehicle speed sensor 18, a torque sensor 20, and a storage 22.

The controller 12 is a central processing unit (CPU) or a micro-processing unit (MPU). The controller 12 can include one or more microcomputers. The storage 22 stores various control programs and information used for various control processes.

The inclination detection unit 14 detects the inclination angle θA related to the human-powered vehicle A. The inclination angle θA includes at least one of a pitch angle DA of the human-powered vehicle A, an inclination angle of the human-powered vehicle A relative to the road surface on which the human-powered vehicle A is traveling, and an inclination angle of the road surface on which the human-powered vehicle A is traveling. The inclination detection unit 14 is connected to the controller 12 to communicate with controller 12 through wired or wireless connection. The inclination detection unit 14 includes an inclination sensor 14A. The inclination sensor 14A is attachable to the human-powered vehicle A. Therefore, an inclination angle θA is easily detected. The inclination sensor 14A is attached to, for example, the frame A5 or the drive unit E. The inclination sensor 14A detects the inclination angle θA related to the human-powered vehicle A based on the position information of the human-powered vehicle A and the map information. Therefore, the inclination angle θA is suitably detected. The inclination sensor 14A includes a global positioning system (GPS) receiver and is connectable to the Internet. The inclination sensor 14A acquires from the GPS and the Internet at least one of the map data of where the human-powered vehicle A is traveling, the gradient of the road surface on which the human-powered vehicle A is traveling, and the state of the road surface on which the human-powered vehicle A is traveling. The inclination sensor 14A does not have to be connected to the Internet. In such a case, the map data is stored in the storage 22.

The inclination detection unit 14 further includes a three-axis gyro sensor 14B and a three-axis acceleration sensor 14C. The output of the inclination detection unit 14 includes information related to the orientation angle of each of the three axes and the acceleration of each of the three axes. The orientation angles of the three axes are the pitch angle DA, the roll angle DB, and the yaw angle DC. It is preferable that the three axes of the gyro sensor 14B coincide with the three axes of the acceleration sensor 14C. Preferably, the gyro sensor 14B and the three-axis acceleration sensor 14C are attached to the frame A5 or the drive unit E so that the left and right directions of the main body A1 (refer to FIG. 1) substantially coincide with the extending direction of the axis of the pitch angle DA.

The rotation angle sensor 16 detects the rotation speed of the crank F1 and the rotation angle of the crank F1. The rotation angle sensor 16 is connected to the controller 12 to communicate with the controller 12 through wired or wireless connection. The rotation angle sensor 16 is attached to the frame A5 (refer to FIG. 1). The rotation angle sensor 16 includes a first element (not shown) that detects the magnetic field of the first magnet (not shown) and a second element (not shown) that outputs a signal corresponding to the positional relationship with the second magnet (not shown). The first magnet is provided on the crank F1, the right crank arm F2, or the left crank arm F3 shown in FIG. 1. Further, the first magnet is arranged coaxially with the crank F1. The first magnet, which is an annular magnet, includes a plurality of magnetic poles alternately arranged in the circumferential direction. The first element detects the rotational phase of the crank F1 relative to the frame A5 or the housing E1. The first element outputs a signal of which single cycle is an angle obtained by dividing 360° for one complete rotation of the crank F1 by the number of magnetic poles of the same polarity. The minimum value of the rotation angle of the crank F1 that is detectable by the rotation angle sensor 16 is less than or equal to 180°, preferably 15°, and further preferably 6°. The second magnet is provided on the crank F1, the right crank arm F2, or the left crank arm F3 and arranged coaxially with the crank F1. The second element detects a reference angle of the crank F1 relative to the frame A5 or the housing E1. An example of the reference angle is the top dead center or the bottom dead center of the crank F1. The second element outputs a signal of which single cycle is a one complete rotation of the crankshaft. The top dead center of the crank F1 indicates a state in which the right crank arm F2 and the left crank arm F3 extend in a direction orthogonal to the road surface and one of the pedals B4 is located farthest from the road surface. The bottom dead center of the crank F1 indicates a state in which the right crank arm F2 and the left crank arm F3 extend in a direction orthogonal to the road surface and the other one of the pedals B4 is located farthest from the road surface. Preferably, the phase difference between the top dead center and the bottom dead center is 180°.

The vehicle speed sensor 18 is connected to the controller 12 to communicate with the controller 12 through wired or wireless connection. The vehicle speed sensor 18 is attached to the front fork A6 (refer to FIG. 1), the chain stay A7 (refer to FIG. 1), or the seat stay A9 (refer to FIG. 1). In a case in which the vehicle speed sensor 18 is attached to the front fork A6, the vehicle speed sensor 18 outputs to the controller 12 a value corresponding to a change in the relative position of a magnet 24 attached to one of the spokes A8 of the front wheel A31. In a case in which the vehicle speed sensor 18 is attached to the chain stay A7 or the seat stay A9, the vehicle speed sensor 18 outputs to the controller 12 a value corresponding to the change in the relative position of a magnet (not shown) attached to one of the spokes A10 of the rear wheel A32. Preferably, the vehicle speed sensor 18 includes a magnetic reed forming a reed switch or a Hall element. The vehicle speed sensor 18 can be configured to detect the vehicle speed through GPS communication.

The torque sensor 20 outputs a signal corresponding to the human driving force. The torque sensor 20 detects the human driving force applied to the crank F1 (refer to FIG. 1). The torque sensor 20 is provided, for example, between the crank F1 and the front sprocket B1, on the crank F1, the front sprocket B1, the right crank arm F2, the left crank arm F3, or the pedal B4. The torque sensor 20 is implemented by, for example, a strain sensor, a magnetostrictive sensor, an optical sensor, a pressure sensor, and the like. Any sensor can be used as the torque sensor 20 as long as it outputs a signal corresponding to the human driving force applied to the right crank arm F2, the left crank arm F3, or the pedal B4.

The controller 12 calculates the inclination angle θA based on the output of the inclination sensor 14A. In another example, the controller 12 calculates the inclination angle θA based on the outputs of the gyro sensor 14B, the acceleration sensor 14C, and the vehicle speed sensor 18. The inclination angle θA is the inclination angle in the front-rear direction of the human-powered vehicle A about the axis extending in the left and right directions of the main body A1 (refer to FIG. 1). That is, the inclination angle θA is the pitch angle DA of the human-powered vehicle A. The inclination angle θA is set to be 0° in a case in which the main body A1 is set in a level state. Therefore, the inclination angle θA is correlated with the gradient of the road surface on which the human-powered vehicle A travels.

The controller 12 calculates the pitch angle DA, the roll angle DB, and the yaw angle DC from the output of the gyro sensor 14B. The controller 12 calculates a first acceleration vector in the front-rear direction of the main body A1 (refer to FIG. 1) from the output of the acceleration sensor 14C. The controller 12 calculates the second acceleration vector from the output of the vehicle speed sensor 18. The controller 12 corrects the pitch angle DA, the roll angle DB, and the yaw angle DC based on the first acceleration vector and the second acceleration vector to reduce the error included in the pitch angle DA, the roll angle DB, and the yaw angle DC. Specifically, the controller 12 calculates correction angles of the pitch angle DA, the roll angle DB, and the yaw angle DC based on the difference between the first acceleration vector and the second acceleration vector. The controller 12 adds the correction angle to the pitch angle DA, the roll angle DB, and the yaw angle DC. The controller 12 calculates the inclination angle θA based on the corrected pitch angle DA, the roll angle DB, the yaw angle DC, and the initial value of the inclination angle of the human-powered vehicle A. In a case in which the gyro sensor 14B and the acceleration sensor 14C are attached to the human-powered vehicle A with the left and right directions of the main body A1 (refer to FIG. 1) substantially coinciding with the extending direction of the axis of the pitch angle DA, the inclination angle θA is calculated based on the pitch angle DA, the roll angle DB, and the initial value of the inclination angle of the human-powered vehicle A. In a case in which the gyro sensor 14B and the acceleration sensor 14C are attached to the human-powered vehicle A with the left and right directions of the main body A1 (refer to FIG. 1) substantially coinciding with the extending direction of the axis of the pitch angle DA and the front-rear direction of the main body A1 (refer to FIG. 1) substantially coinciding with the axis of the roll angle DB, the inclination angle θA is calculated based on the pitch angle DA and the initial value of the inclination angle of the human-powered vehicle A.

The controller 12 calculates the rotation angle θB of the crank F1 based on the output of the rotation angle sensor 16. The controller 12 calculates the rotation angle θB of the crank F1 with the top dead center or the bottom dead center of the crank F1 as 0°. The rotation angle θB of the crank F1 is greater than or equal to 0° and less than 360°.

The controller 12 calculates the rotation speed of the crank F1 based on the output of the rotation angle sensor 16. The controller 12 calculates the travel distance per unit time (hereinafter referred to as "vehicle speed V") of the human-powered vehicle A based on the output of the vehicle speed sensor 18 and the circumferential length of the front wheel A31 (refer to FIG. 1) stored in advance in the storage 22. The controller 12 calculates the human driving force per unit time based on the output of the torque sensor 20.

The controller 12 executes shift control for controlling the transmission E21 based on the shift-up signal and the shift-down signal from the operation unit C. In a case in which the shift-up signal is input, the controller 12 operates the transmission E21 to increase the ratio RA. In a case in which the shift-down signal is input, the controller 12 operates the transmission E21 to decrease the ratio RA.

The controller 12 controls the motor E32. The controller 12 executes assist control for controlling the motor E32 based on the human driving force and the vehicle speed V. The assist control is executed by the controller 12 so that the controller stops driving the motor E32 in at least one of a case in which the vehicle speed V is greater than or equal to a predetermined speed set in advance and a case in which the human driving force is not input to the crank F1. The predetermined speed is, for example, 25 km/h per hour. The controller 12 controls the motor E32 so that the output of the motor E32 becomes less than or equal to a predetermined output.

In a case in which the inclination angle θA related to the human-powered vehicle A is greater than or equal to the first predetermined angle and a request for operating the transmission E21 provided on the human-powered vehicle A is received, the controller 12 controls the motor E32 in a first control state in which an assist force produced by the motor E32 becomes less than or equal to a first predetermined value. The first predetermined angle is, for example, an angle at which it is determined that the road surface on which the human-powered vehicle A is traveling is an ascending gradient. Even in a case in which a request for operating the transmission E21 is received, the controller 12 does not change the control state of the motor E32 to the first control state in a case in which the inclination angle θA is less than the first predetermined angle. In the first control state, the controller 12 is configured to control the motor E32 so that the assist force produced by the motor E32 is in a first predetermined range that is greater than 0 Nm. This limits sudden changes in the assist force in the first control state. The first predetermined range is, for example, greater than 0 Nm and less than or equal to 25 Nm. Thus, sudden changes in the assist force in the first control state are limited. In one example, the controller 12 controls the motor E32 so that the assist force of the motor E32 is less than or equal to 20 Nm in the first control state. In at least one of a state in which the motor E32 is assisting the human-powered vehicle A (hereinafter referred to as "assist state") and a state in which the human-powered vehicle A is traveling (hereinafter referred to as "vehicle traveling state"), the controller 12 controls the motor E32 in the first control state in a case in which the inclination angle θA related to the human-powered vehicle A is greater than or equal to the first predetermined value and a request for operating the transmission E21 provided on the human-powered vehicle A is received. The assist force of the motor E32 is controlled taking into consideration the inclination angle θA. Thus, the assist force is suitably controlled. The assist state is, for example, a state in which the motor E32 is outputting the assist force. The vehicle traveling state is, for example, a state in which the vehicle speed V detected by the vehicle speed sensor 18 is greater than zero. The request for operating the transmission E21 of the human-powered vehicle A includes a request for decreasing the first rotation ratio of the rotation speed of the drive wheel A3 to the rotation speed of the crank F1 of the human-powered vehicle A. Therefore, the assist force is suitably controlled in a case in which a request for decreasing the first rotation ratio is received. The request for operating the transmission E21 provided on the human-powered vehicle A includes a request for increasing the first rotation ratio. The controller 12 is configured to control the motor E32 in a second control state in which the assist force produced by the motor E32 to the human driving force becomes the first assist ratio. Therefore, the assist force of the motor E32 is controlled in a versatile manner. In a case in which the motor E32 is controlled in the first control state and a first predetermined condition is satisfied, the controller 12 changes a control state of the motor E32 to the second control state. Therefore, the control state of the motor E32 is suitably switched from the first control state to the second control state. The first predetermined condition is satisfied in a case in which the rotation angle of the crank F1 of the human-powered vehicle A is included in a predetermined angular range. The first predetermined condition is determined based on the rotation angle of the crank F1. Thus, the first predetermined condition is easily determined. The predetermined angular range includes a range excluding the top dead center and the bottom dead center of the crank F1. Therefore, the control state of the motor E32 is switched from the first control state to the second control state in a case in which the rotation angle of the crank F1 is neither the top dead center nor the bottom dead center. In a case in which the assist force produced by the motor E32 is less than or equal to the first predetermined value, the controller 12 operates the transmission E21 in accordance with the request for operating the transmission E21. Therefore, the transmission E21 is suitably operated.

Figure 3:
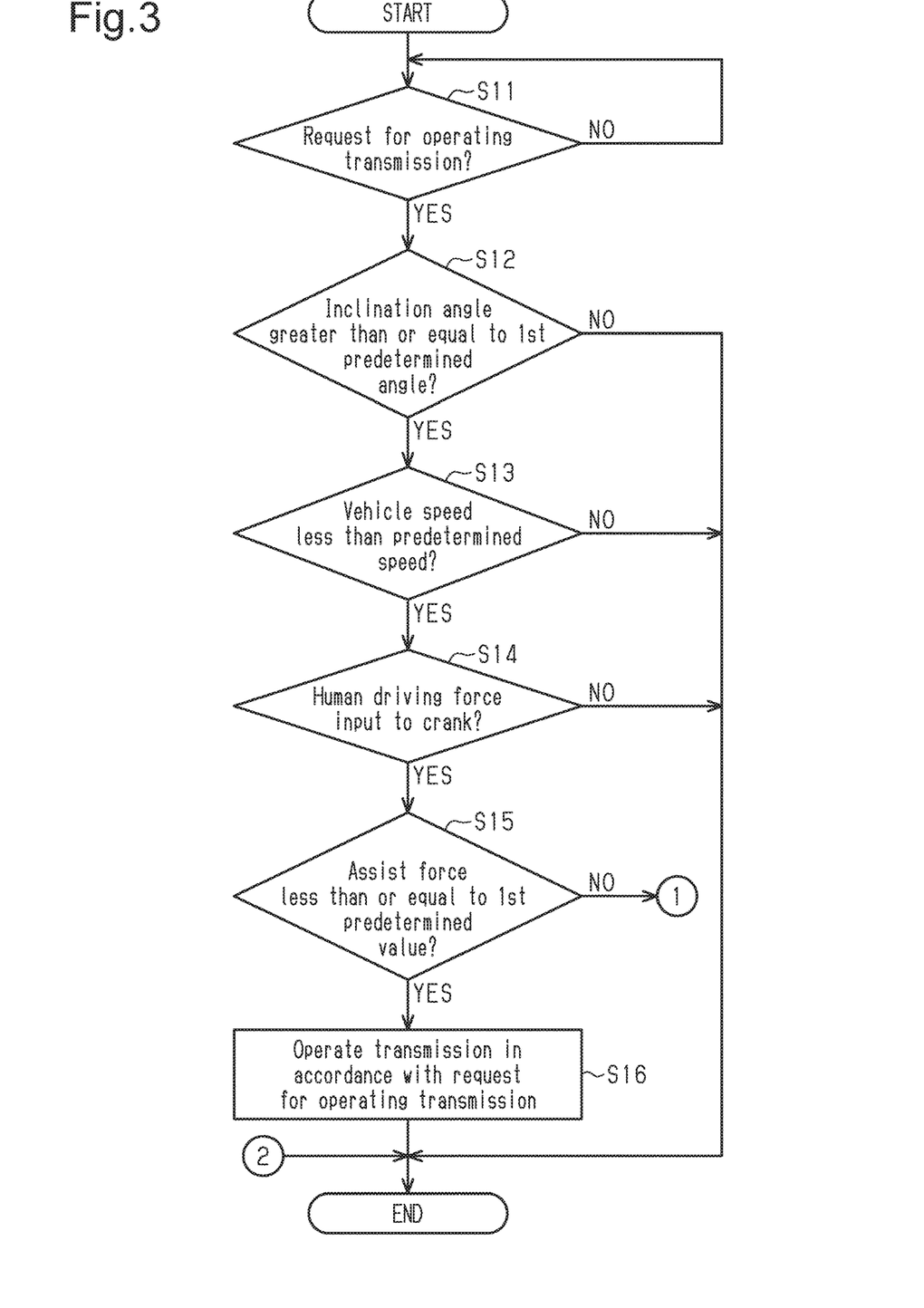
FIG. 3 is a flowchart showing an example of the procedure for processing the assist control executed by a controller illustrated in FIG. 2.

An example of the assist control will now be described with reference to FIG. 3. The assist control is executed in a case in which the human-powered vehicle A is in at least one of the assist state and the vehicle traveling state.

In step S11, the controller 12 determines whether or not a request for operating the transmission E21 is received, based on the output of the operation unit C. The controller 12 determines that a request for operating the transmission E21 is received based on an input of the shift-up signal or the shift-down signal from the operation unit C. In a case in which the determination result of step S11 is negative, the controller 12 repeatedly executes the determination of step S11. In a case in which the determination result of step S11 is affirmative, the controller 12 executes step S12.

In step S12, the controller 12 determines whether or not the inclination angle θA is greater than or equal to the first predetermined angle based on the output of the inclination detection unit 14. In a case in which the determination result of step S12 is negative, the controller 12 ends the present control. In a case in which the determination result of step S12 is affirmative, the controller 12 executes step S13.

In step S13, the controller 12 determines whether or not the vehicle speed V is less than the predetermined speed based on the output of the vehicle speed sensor 18. In a case in which the determination result of step S13 is negative, the controller ends the present control. In a case in which the determination result of step S13 is affirmative, the controller 12 executes step S14.

In step S14, the controller 12 determines whether or not the human driving force is input to the crank F1 based on the output of the torque sensor 20. In a case in which the determination result of step S14 is negative, the controller 12 ends the present control. In a case in which the determination result of step S14 is affirmative, the controller 12 executes step S15.

In step S15, the controller 12 determines whether or not the assist force of the motor E32 is less than or equal to a first predetermined value. In a case in which the determination result of step S15 is affirmative, the controller 12 executes step S16.

In step S16, the controller 12 operates the transmission E21 in accordance with the request for operating the transmission E21. In a case in which the shift-up signal is input from the operation unit C, the controller 12 operates the transmission E21 to increase the ratio RA. In a case in which the shift-down signal is input from the operation unit C, the controller 12 operates the transmission E21 to decrease the ratio RA.

Figure 4:
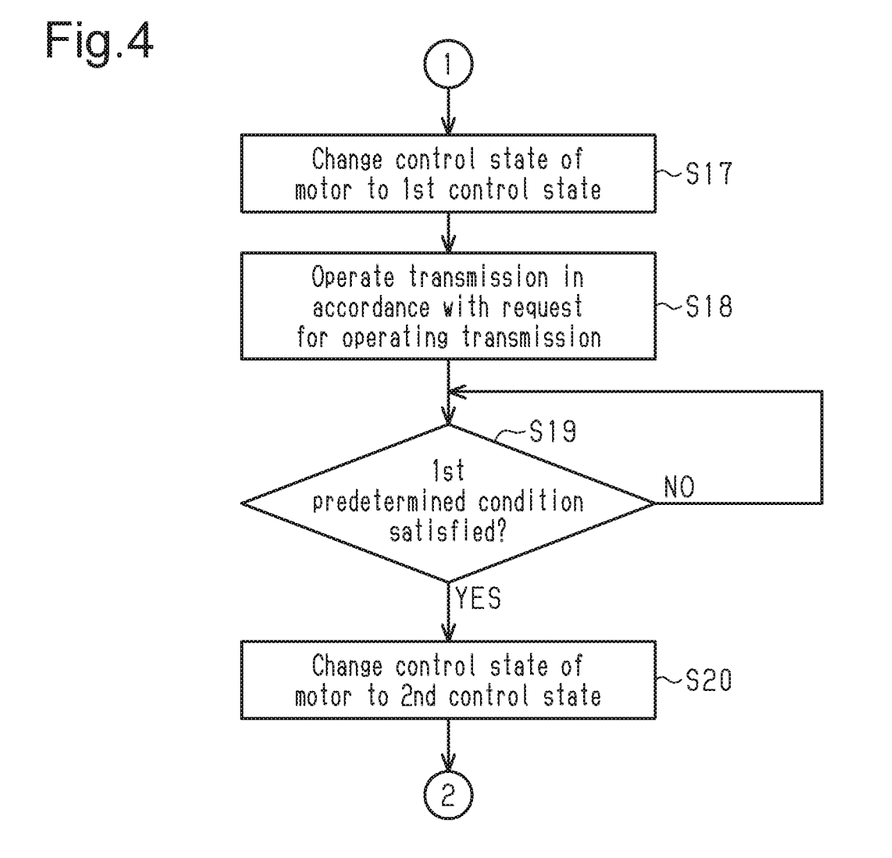
FIG. 4 is a flowchart showing an example of the procedure for processing the assist control executed by the controller illustrated in FIG. 2.

In a case in which the determination result of step S15 is negative, the controller 12 executes step S17 illustrated in FIG. 4. In step S17, the controller 12 changes the control state of the motor to the first control state. Therefore, the assist force of the motor E32 is set to the first predetermined range. In step S18, the controller 12 operates the transmission E21 in accordance with the request for operating the transmission E21. The specific mode of operation of the transmission E21 is the same as step S16.

In step S19, the controller 12 determines whether or not the first predetermined condition is satisfied based on the output of the rotation angle sensor 16. In a case in which the determination result of step S19 is negative, that is, in a case in which the rotation angle of the crank F1 is not included in the first predetermined angular range, the controller 12 re-executes the determination of step S19. In a case in which the determination result of step S19 is affirmative, that is, in a case in which the rotation angle of the crank F1 is included in the first predetermined angular range, the controller 12 executes step S20. In step S20, the controller 12 changes the control state of the motor E32 from the first control state to the second control state.

The control device 10 of the first embodiment has the following advantage.

The assist force of the motor E32 is controlled taking into consideration the inclination angle θA related to the human-powered vehicle A. Thus, the assist force is suitably controlled.

Second Embodiment

Figure 5:
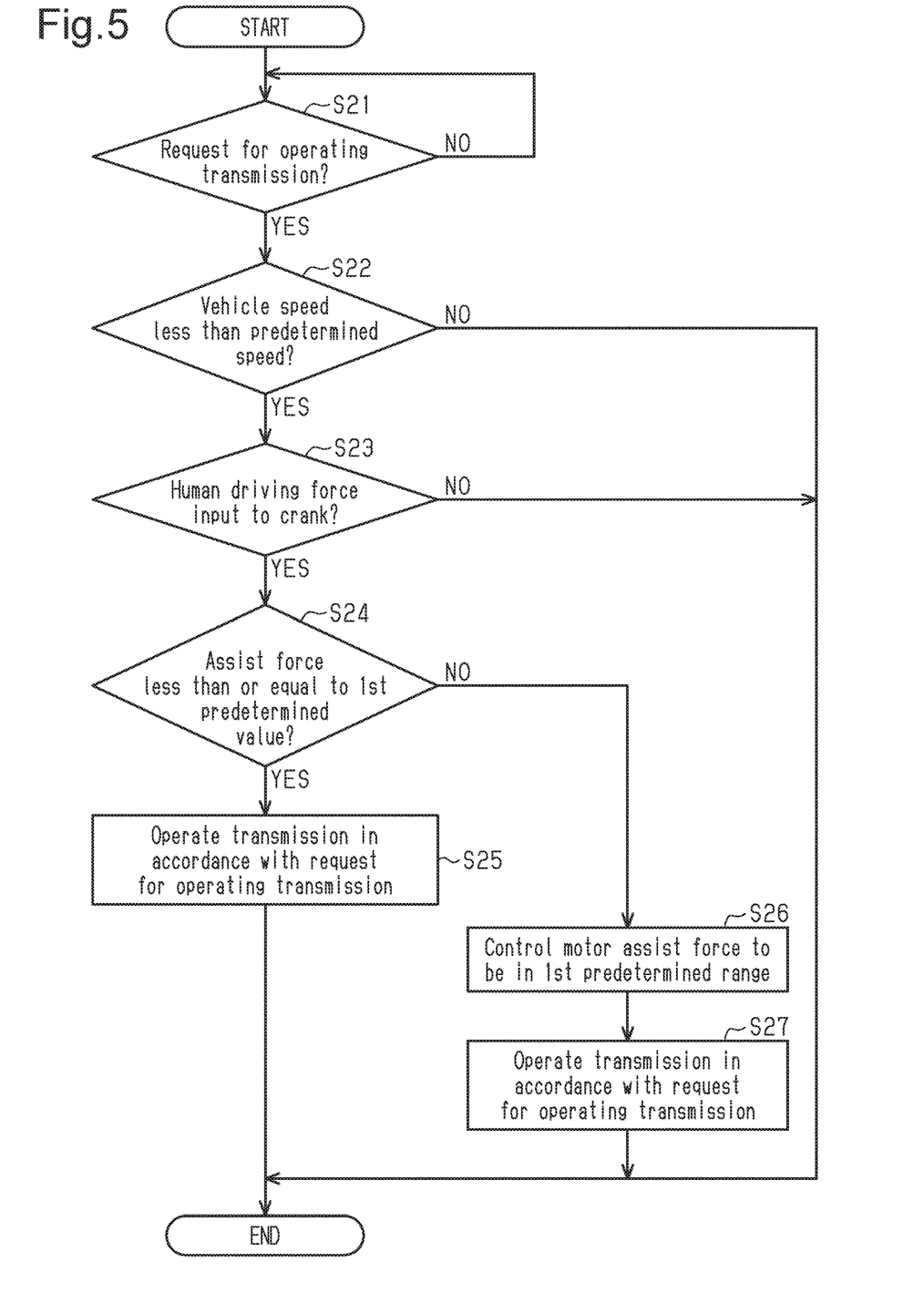
FIG. 5 is a flowchart showing an example of the procedure for processing the assist control executed by a controller of a control device in accordance with a second embodiment.

A control device 10 in accordance with a second embodiment will now be described with reference to FIG. 5. The control device 10 of the second embodiment is similar to the control device 10 of the first embodiment except in the content of the assist control. Thus, same reference numerals are given to those components that are the same as the corresponding components of the first embodiment. Such components will not be described in detail.

The control device 10 includes the controller 12 that controls the motor E32 that assists propulsion of the human-powered vehicle A. In at least one of a state in which the motor E32 is assisting the human-powered vehicle A (assist state) and a state in which the human-powered vehicle A is traveling (vehicle traveling state), the controller 12 controls the motor E32 so that an assist force produced by the motor E32 is in a first predetermined range that is greater than 0 Nm and less than or equal to 25 Nm in a case in which a request for operating a transmission E21 provided on the human-powered vehicle A is received.

One example of the assist control executed by the control device 10 of the second embodiment will now be described with reference to FIG. 5. The assist control is executed in a case in which the human-powered vehicle A is in at least one of the assist state and the vehicle traveling state.

In step S21, the controller 12 determines whether or not a request for operating the transmission E21 is received, based on the output of the operation unit C. The controller 12 determines that a request for operating the transmission E21 is received based on an input of the shift-up signal or the shift-down signal from the operation unit C. In a case in which the determination result of step S21 is negative, the controller 12 repeatedly executes the determination of step S21. In a case in which the determination result of step S21 is affirmative, the controller 12 executes step S22.

In step S22, the controller 12 determines whether or not the vehicle speed V is less than the predetermined speed based on the output of the vehicle speed sensor 18. In a case in which the determination result of step S22 is negative, the controller ends the present control. In a case in which the determination result of step S22 is affirmative, the controller 12 executes step S23.

In step S23, the controller 12 determines whether or not the human driving force is input to the crank F1 based on the output of the torque sensor 20. In a case in which the determination result of step S23 is negative, the controller 12 ends the present control. In a case in which the determination result of step S23 is affirmative, the controller 12 executes step S24.

In step S24, the controller 12 determines whether or not the assist force of the motor E32 is less than or equal to a first predetermined value. In a case in which the determination result of step S24 is affirmative, the controller 12 executes step S25.

In step S25, the controller 12 operates the transmission E21 in accordance with the request for operating the transmission E21. In a case in which the shift-up signal is input from the operation unit C, the controller 12 operates the transmission E21 to increase the ratio RA. In a case in which the shift-down signal is input from the operation unit C, the controller 12 operates the transmission E21 to decrease the ratio RA.

If the determination result of step S24 is negative, the controller 12 executes step S26. In step S26, the controller 12 sets the assist force of the motor E32 to be in the first predetermined range. In step S27, the controller 12 operates the transmission E21 in accordance with the request for operating the transmission E21. The specific mode of operation of the transmission E21 is the same as step S25.

The control device 10 of the second embodiment has the following advantage.

The assist force of the motor E32 is set to the first predetermined range in a case in which a request for operating the transmission E21 is received. Thus, the assist force is suitably controlled.

Third Embodiment

Figure 6:
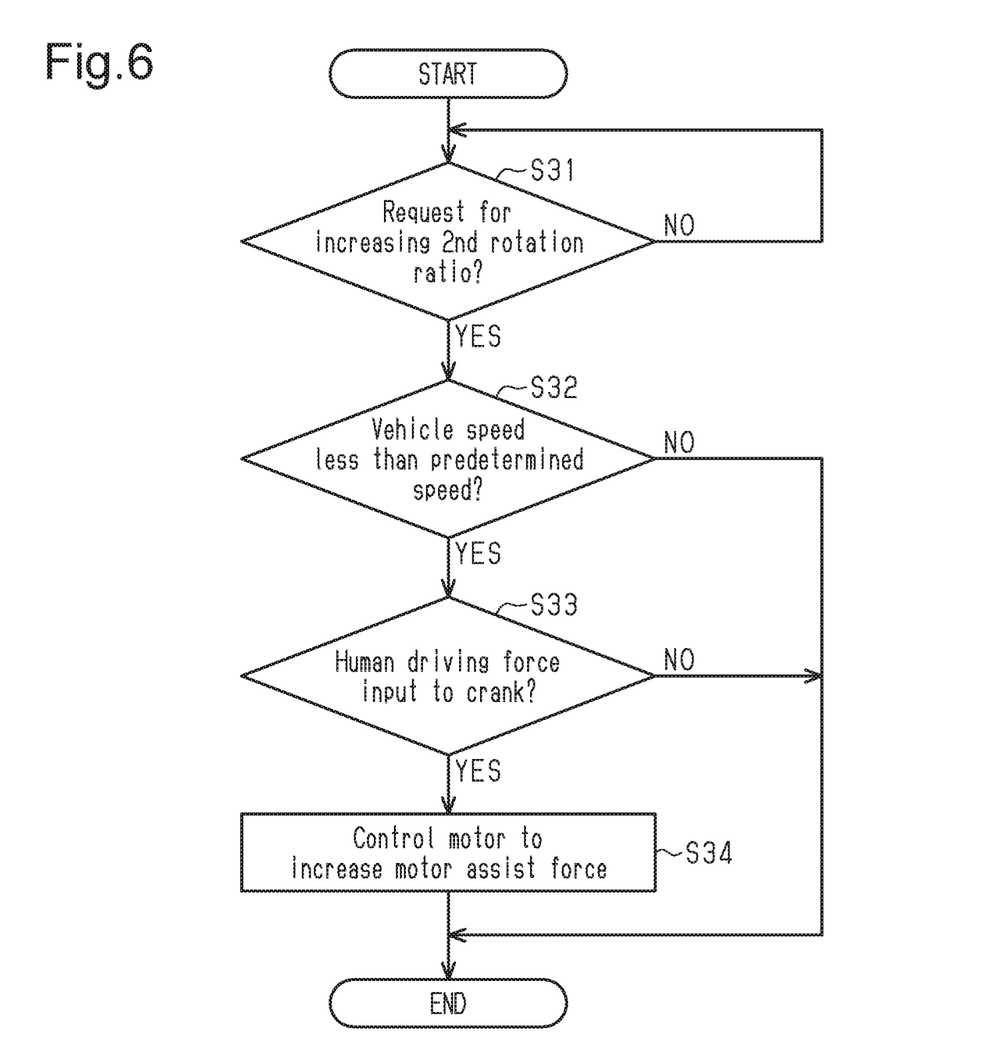
FIG. 6 is a flowchart showing an example of the procedure for processing the assist control executed by a controller of a control device in accordance with a third embodiment.

A control device 10 in accordance with a third embodiment will now be described with reference to FIG. 6. The control device 10 of the third embodiment is similar to the control device 10 of the first embodiment except in the content of the assist control. Thus, same reference numerals are given to those components that are the same as the corresponding components of the first embodiment. Such components will not be described in detail.

The control device 10 includes the controller 12 that controls the motor E32 that assists propulsion of the human-powered vehicle A. In a case in which a request for increasing the second rotation ratio of the rotation speed of the drive wheel A3 to the rotation speed of the crank F1 of the human-powered vehicle A is received, the controller 12 controls the motor E32 so that the assist force produced by the motor E32 increases.

An example of the assist control executed by the control device 10 of the third embodiment will now be described with reference to FIG. 6. The assist control is executed in a case in which the human-powered vehicle A is in at least one of the assist state and the vehicle traveling state.

In step S31, the controller 12 determines whether or not a request for increasing the second rotation ratio is received, based on the output of the operation unit C. For example, the controller 12 determines that a request for increasing the second rotation ratio is received, based on the input of the shift-up signal from the operation unit C. In a case in which the determination result of step S31 is negative, the controller 12 repeatedly executes the determination of step S31. In a case in which the determination result of step S31 is affirmative, the controller 12 executes step S32.

In step S32, the controller 12 determines whether or not the vehicle speed V is less than a predetermined speed based on the output of the vehicle speed sensor 18. In a case in which the determination result of step S32 is negative, the controller ends the present control. In a case in which the determination result of step S32 is affirmative, the controller 12 executes step S33.

In step S33, the controller 12 determines whether or not human driving force is being input to the crank F1 based on the output of the torque sensor 20. In a case in which the determination result of step S33 is negative, the controller 12 ends the present control. In a case in which the determination result of step S33 is affirmative, the controller 12 executes step S34. In step S34, the controller 12 controls the motor E32 so that the assist force of the motor E32 increases.

The control device 10 of the third embodiment has the following advantage.

In a case in which there is a request to increase the second rotation ratio, the assist force is increased. Thus, the load on the rider is suitably reduced.

Fourth Embodiment

Figure 7:
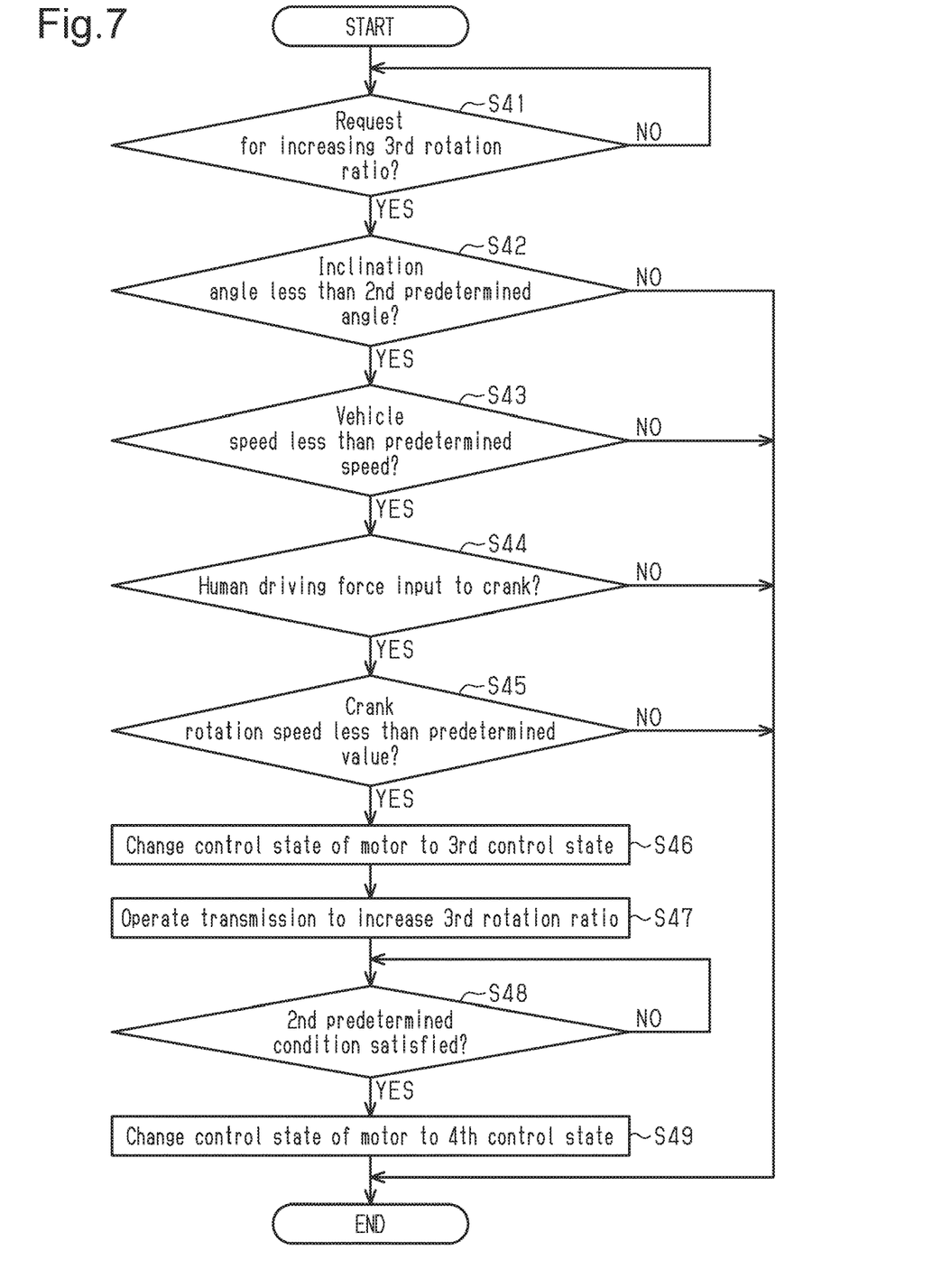
FIG. 7 is a flowchart showing an example of the procedure for processing the assist control executed by a controller of a control device in accordance with a fourth embodiment.

A control device 10 in accordance with a fourth embodiment will now be described with reference to FIG. 7. The control device 10 of the fourth embodiment is similar to the control device 10 of the first embodiment except in the content of the assist control. Thus, the same reference numerals are given to those components that are the same as the corresponding components of the first embodiment. Such components will not be described in detail.

The control device 10 includes the controller 12 that controls the motor E32 that assists propulsion of the human-powered vehicle A. In at least one of a state in which the motor E32 is assisting propulsion of the human-powered vehicle A (assist state), a state in which the human-powered vehicle A is traveling (vehicle traveling state), and a state in which acceleration of the human-powered vehicle A is greater than or equal to a predetermined acceleration (hereinafter referred to as "predetermined acceleration state"), the controller 12 controls the motor E32 in a third control state that increases an assist force produced by the motor E32 in a case in which an inclination angle θA related to the human-powered vehicle A is less than a second predetermined angle and a request for increasing a third rotation ratio of a rotation speed of a drive wheel A3 to a rotation speed of a crank F1 of the human-powered vehicle A is received. The second predetermined angle is, for example, an angle at which it is determined that the road surface on which the human-powered vehicle A is traveling is a descending gradient. The second predetermined angle is, for example, an angle at which it is determined that the road surface on which the human-powered vehicle A is traveling is flat. The second predetermined angle is, for example, an angle at which it is determined that the road surface on which the human-powered vehicle A is traveling is an uphill gradient of less than a predetermined angle. The state in which the human-powered vehicle A is traveling includes a state in which the motor E32 does not assist the propulsion of the human-powered vehicle A. Therefore, the assist force of the motor E32 is suitably controlled in a case in which a request for acceleration is received from the rider in a state in which the propulsion of the human-powered vehicle A is not assisted. The controller 12 is configured to control the motor E32 in the fourth control state in which the assist force produced by the motor E32 to the human driving force becomes a second assist ratio. Therefore, the assist force of the motor E32 is controlled in a versatile manner. In the third control state, the controller 12 controls the motor E32 so that the assist force produced by the motor E32 to the human driving force becomes a third assist ratio that is larger than the second assist ratio. Therefore, the load of the rider is suitably reduced. In a case in which the second predetermined condition is satisfied after the control state of the motor E32 is changed to the third control state, the controller 12 changes the control state to the fourth control state. Thus, in a case in which the second predetermined condition is satisfied, the control state of the motor E32 is suitably switched from the third control state to the fourth control state. The second predetermined condition includes one of the rotation speed of the crank F1 of the human-powered vehicle A and the rotation angle of the crank F1. Therefore, the control state of the motor E32 is suitably switched from the third control state to the fourth control state based on the rotation speed of the crank F1 and the rotation angle of the crank F1. In one example, the second predetermined condition is satisfied in a case in which the rotation speed of the crank F1 is greater than or equal to 55 rpm. Thus, the assist force is suitably reduced in a case in which the rotation speed of the crank F1 is greater than or equal to 55 rpm. In a further preferred example, the second predetermined condition is satisfied in a case in which the rotation speed of the crank F1 is greater than or equal to 60 rpm. In one example, the second predetermined condition is satisfied in a case in which the rotation angle of the crank F1 is greater than or equal to 360°. More preferably, the second predetermined condition is satisfied in a case in which the rotation angle of the crank F1 is greater than or equal to 270°. Further preferably, the second predetermined condition is satisfied in a case in which the rotation angle of the crank F1 is greater than or equal to 180°. In a case in which the rotation speed of the crank F1 of the human-powered vehicle A is greater than or equal to a predetermined value, the controller prohibits control of the motor E32 in the third control state. Therefore, the assist force does not increase in a case in which the rotation speed of the crank F1 is greater than or equal to the predetermined value. An example of the predetermined value is 70 rpm. A further preferred example of the predetermined value is 65 rpm. An even further preferred example of the predetermined value is 61 rpm. The controller 12 starts controlling the motor E32 in the third control state immediately before changing the third rotation ratio, when changing the third rotation ratio, or immediately after changing the third rotation ratio. Therefore, the transmission E21 is suitably operated. The controller 12 increases the assist force in a stepped manner in the third control state at timings including at least two of immediately before changing the third rotation ratio, when changing the third rotation ratio, and immediately after changing the third rotation ratio. Therefore, the assist force is suitably increased.

An example of the assist control executed by the control device 10 of the fourth embodiment will now be described with reference to FIG. 7. The assist control is executed in a case in which the state of the human-powered vehicle A is at least one of the assist state, the vehicle traveling state, and the predetermined acceleration state.

In step S41, the controller 12 determines whether or not a request for increasing the third rotation ratio is received, based on the output of the operation unit C. For example, the controller 12 determines that a request for increasing the third rotation ratio is received based on the input of the shift-up signal from the operation unit C. In a case in which the determination result of step S41 is negative, the controller 12 repeatedly executes the determination of step S41. In a case in which the determination result of step S41 is affirmative, the controller 12 executes step S42.

In step S42, the controller 12 determines whether or not the inclination angle θA is less than the second predetermined angle based on the output of the inclination detection unit 14. In a case in which the determination result of step S42 is negative, the controller 12 ends the present control. In a case in which the determination result of step S42 is affirmative, the controller 12 executes step S43.

In step S43, the controller 12 determines whether or not the vehicle speed V is less than the predetermined speed based on the output of the vehicle speed sensor 18. In a case in which the determination result of step S43 is negative, the controller ends the present control. In a case in which the determination result of step S43 is affirmative, the controller 12 executes step S44.

In step S44, the controller 12 determines whether or not the human driving force is input to the crank F1 based on the output of the torque sensor 20. In a case in which the determination result of step S44 is negative, the controller 12 ends the present control. In a case in which the determination result of step S44 is affirmative, the controller 12 executes step S45.

In step S45, the controller 12 determines whether or not the rotation speed of the crank F1 is less than a predetermined value based on the output of the rotation angle sensor 16. In a case in which the determination result of step S45 is negative, the controller 12 ends the present control. In a case in which the determination result of step S45 is affirmative, the controller 12 executes step S46.

In step S46, the controller 12 changes the control state of the motor E32 to the third control state. Therefore, the assist force produced by the motor E32 is set to be the third assist ratio.

In step S47, the controller 12 operates the transmission E21 so that the third rotation ratio increases. The controller 12 starts controlling the motor E32 in the third control state immediately before changing the third rotation ratio. The controller 12 can start controlling the motor E32 in the third control state when changing the third rotation ratio or immediately after changing the third rotation ratio. Preferably, the controller 12 increases the assist force in a stepped manner at timings including at least two of immediately before changing the third rotation ratio, when changing the third rotation ratio, and immediately after changing the third rotation ratio.

In step S48, the controller 12 determines whether or not the second predetermined condition is satisfied based on the output of the rotation angle sensor 16. For example, in a case in which the rotation speed of the crank F1 is greater than or equal to 55 rpm, the controller 12 determines that the second predetermined condition is satisfied. In a case in which the determination result of step S48 is negative, the controller 12 re-executes step S48. In a case in which the determination result of step S48 is affirmative, the controller 12 executes step S49. In step S49, the controller 12 changes the control state of the motor E32 from the third control state to the fourth control state.

The control device 10 of the fourth embodiment has the following advantage.

The assist force of the motor E32 is suitably controlled based on the acceleration request of the rider.

Modified Examples

The description related with the above embodiment exemplifies, without any intention to limit, an applicable form of a human-powered vehicle control device in accordance with the present disclosure. The human-powered vehicle control device in accordance with the present disclosure is applicable to a form that differs from the form exemplified in the above embodiment. Such an example is a form from which part of the structure in the above embodiment is replaced, changed, or omitted. A new element may also be added. Modified examples of the above embodiment will now be described.

The first predetermined condition related to the assist control executed by the control device 10 of the first embodiment can be changed to any condition. In one example, the first predetermined condition relates to time. Therefore, the control state of the motor E32 is switched from the first control state to the second control state based on the time. In step S19 of the assist control, the controller 12 of the control device 10 of the modified example determines whether or not a predetermined time has elapsed from the starting point. An example of the starting point is when the controller 12 receives a shift-up signal or a shift-down signal, and when the transmission E21 executes a shift operation. The predetermined time is, for example, a time at which the operation of the transmission E21 is assumed to be completed. The controller 12 executes step S20 in a case in which the predetermined time has elapsed from the starting point. In a case in which the predetermined time has not elapsed since the start point, the controller 12 re-executes the determination of step S20. In another example, in a case in which the operation of the transmission E21 is completed, the first predetermined condition is satisfied. Therefore, in a case in which the operation of the transmission E21 is completed, the control state of the motor E32 is switched from the first control state to the second control state. The completion of the operation of the transmission E21 is, for example, the completion of the operation of the motor E32, the change of the ratio RA to the ratio RA corresponding to the request for operating the transmission E21, and the completion of the operation of the transmission E21. The completion of the operation of the transmission E21 is detected by a sensor provided on the transmission E21 or a sensor provided on the human-powered vehicle A at a location other than the transmission E21.

The content of the assist control executed by the control device 10 of the first embodiment can be changed to any content. In one example, the control device 10 executes step S12 prior to step S11 in the assist control shown in FIG. 3. That is, in step S12, the controller 12 of the control device 10 of the present modified example determines whether or not the inclination angle θA is greater than or equal to the first predetermined angle based on the output of the inclination detection unit 14. In a case in which the determination result of step S12 is negative, the controller 12 repeatedly executes the determination of step S12. In a case in which the determination result of step S12 is affirmative, the controller 12 executes step S11. In step S11, the controller 12 determines whether or not a request for operating the transmission E21 is received, based on the output of the operation unit C. The controller 12 determines that a request for operating the transmission E21 is received, based on an input of the shift-up signal or the shift-down signal from the operation unit C. In a case in which the determination result of step S11 is negative, the controller 12 ends the present control. In a case in which the determination result of step S11 is affirmative, the controller 12 executes step S13.

In the third control state of the assist control executed by the control device 10 of the fourth embodiment, the assist force produced by the motor E32 to the human driving force can be changed to any value. In one example, in the third control state, the controller 12 controls the motor E32 so as to generate a first assist force obtained by adding a predetermined assist force to an assist force having a third assist ratio larger than the second assist ratio with respect to the human driving force. Therefore, the load of the rider is suitably reduced. In another example, in the third control state, the controller 12 controls the motor E32 so as to generate a second assist force obtained by adding a predetermined assist force to an assist force having the second assist ratio with respect to the human driving force. Therefore, the load of the rider is suitably reduced. The predetermined assist force is changed in the modified examples in accordance with at least one of the third rotation ratio and a change amount of the third rotation ratio. Therefore, a predetermined assist force is suitably set. In one example, the predetermined assist force increases as the change amount of the third rotation ratio increases. Therefore, the load of the rider is suitably reduced. For one example, the phrase "at least one of" as used in this disclosure means "only one single choice" or "both of two choices" if the number of choices is two. For other example, the phrase "at least one of" as used in this disclosure means "only one single choice" or "any combination of equal to or more than two choices" if the number of choices is equal to or more than three.

DESCRIPTION OF REFERENCE CHARACTERS 10) control device, 12) controller, 14) inclination detection unit, 14A) inclination sensor

The invention claimed is:

1. A human-powered vehicle control device comprising:
a controller that controls a motor assisting propulsion of a human-powered vehicle, wherein
the controller controls the motor in a first control state in which an assist force produced by the motor becomes less than or equal to a first predetermined value in a case in which an inclination angle related to the human-powered vehicle is greater than or equal to a first predetermined angle and a request for operating a transmission provided on the human-powered vehicle is received,
the controller determines that the request for operating the transmission is received based on a shift-up signal or a shift-down signal,
a first predetermined condition is satisfied in a case in which a rotation angle of a crank of the human-powered vehicle is within a predetermined angular range that excludes a top dead center and a bottom dead center of the crank, and
when the motor is controlled in the first control state and the first predetermined condition is satisfied, the controller changes a control state of the motor to a second control state in which the assist force produced by the motor to a human driving force becomes a first assist ratio.

2. The human-powered vehicle control device according to claim 1,
wherein the controller is configured to control the motor in the first control state so that the assist force produced by the motor is in a first predetermined range that is greater than 0 Nm.

3. The human-powered vehicle control device according to claim 2,
wherein the controller controls the motor in the first control state in at least one of a state in which the motor is assisting the human-powered vehicle and a state in which the human-powered vehicle is traveling.

4. The human-powered vehicle control device according to claim 2,
wherein the first predetermined range is greater than 0 Nm and less than or equal to 25 Nm.

5. The human-powered vehicle control device according to claim 1, further comprising an inclination detection unit that detects the inclination angle related to the human-powered vehicle.

6. The human-powered vehicle control device according to claim 5,
wherein the inclination detection unit includes an inclination sensor that is attachable to the human-powered vehicle.

7. The human-powered vehicle control device according to claim 5,
wherein the inclination detection unit detects the inclination angle related to the human-powered vehicle based on position information of the human-powered vehicle and map information.

8. The human-powered vehicle control device according to claim 1,
wherein the request for operating the transmission provided on the human-powered vehicle includes a request for decreasing a first rotation ratio of a rotation speed of a drive wheel to a rotation speed of the crank of the human-powered vehicle.

9. The human-powered vehicle control device according to claim 1, wherein the controller operates the transmission in accordance with the request for operating the transmission in a case in which the assist force produced by the motor is less than or equal to the first predetermined value.

10. A human-powered vehicle control device comprising:
a controller that controls a motor assisting propulsion of a human-powered vehicle, wherein
in at least one of a state in which the motor is assisting the human-powered vehicle and a state in which the human-powered vehicle is traveling, the controller controls the motor in a first control state so that an assist force produced by the motor is in a first predetermined range that is greater than 0 Nm and less than or equal to 25 Nm in a case in which a request for operating a transmission provided on the human-powered vehicle is received,
the controller determines that the request for operating the transmission is received based on a shift-up signal or a shift-down signal, and
when a rotation angle of a crank of the human-powered vehicle is within a predetermined angular range that excludes a top dead center and a bottom dead center of the crank, the controller changes a control state of the motor to a second control state in which the assist force produced by the motor to a human driving force becomes a first assist ratio.

11. A human-powered vehicle control device comprising:
a controller that controls a motor assisting propulsion of a human-powered vehicle, wherein
the controller controls the motor to increase an assist force produced by the motor in a case in which a request for increasing a rotation ratio of a rotation speed of a drive wheel to a rotation speed of a crank of the human-powered vehicle is received,
the controller determines that the request for increasing the rotation ratio is received based on a shift-up signal, and
when the motor is controlled in a first control state and a rotation angle of the crank of the human-powered vehicle is within a predetermined angular range that excludes a top dead center and a bottom dead center of the crank, the controller changes a control state of the motor to a second control state in which the assist force produced by the motor to a human driving force becomes a first assist ratio.

12. A human-powered vehicle control device comprising:
a controller that controls a motor assisting propulsion of a human-powered vehicle, wherein
in at least one of a state in which the motor is assisting propulsion of the human-powered vehicle, a state in which the human-powered vehicle is traveling, and a state in which an acceleration of the human-powered vehicle is greater than or equal to predetermined acceleration, the controller controls the motor in a first control state that increases an assist force produced by the motor in a case in which an inclination angle related to the human-powered vehicle is less than a first predetermined angle and a request for increasing a rotation ratio of a rotation speed of a drive wheel to a rotation speed of a crank of the human-powered vehicle is received,
the controller determines that the request for increasing the rotation ratio is received based on a shift-up signal, and
when the motor is controlled in the first control state and a rotation angle of the crank of the human-powered vehicle is within a predetermined angular range that excludes a top dead center and a bottom dead center of the crank, the controller changes a control state of the motor to a second control state.

13. The human-powered vehicle control device according to claim 12,
wherein the state in which the human-powered vehicle is traveling includes a state in which the motor is not assisting propulsion of the human-powered vehicle.

14. The human-powered vehicle control device according to claim 12,
wherein the controller is configured to control the motor in the second control state so that the assist force produced by the motor to human driving force becomes a first assist ratio.

15. The human-powered vehicle control device according to claim 14,
wherein the controller controls the motor in the third control state so that the assist force produced by the motor to the human driving force becomes a second assist ratio that is larger than the first assist ratio.

16. The human-powered vehicle control device according to claim 14,
wherein the controller controls the motor in the first control state to generate a first assist force by adding a predetermined assist force to an assist force obtaining a second assist ratio that is larger than the first assist ratio with respect to the human driving force.

17. The human-powered vehicle control device according to claim 14,
wherein the controller controls the motor in the first control state to generate a first assist force by adding a predetermined assist force to the first assist ratio with respect to the human driving force.

18. The human-powered vehicle control device according to claim 16,
wherein the predetermined assist force is changed in accordance with at least one of the rotation ratio and a change amount of the rotation ratio.

19. The human-powered vehicle control device according to claim 18,
wherein the predetermined assist force increases as the change amount of the rotation ratio increases.

20. The human-powered vehicle control device according to claim 14,
wherein the controller changes the control state of the motor to the second control state in a case in which a second predetermined condition is satisfied after changing the control state of the motor to the first control state.

21. The human-powered vehicle control device according to claim 20,
wherein the second predetermined condition includes one of a rotation speed of the crank of the human-powered vehicle and the rotation angle of the crank.

22. The human-powered vehicle control device according to claim 21,
wherein the second predetermined condition is satisfied in a case in which the rotation speed of the crank becomes greater than or equal to 55 rpm.

23. The human-powered vehicle control device according to claim 12,
wherein the controller prohibits control of the motor in the first control state in a case in which the rotation speed of the crank of the human-powered vehicle is greater than or equal to a predetermined value.

24. The human-powered vehicle control device according to claim 12, wherein the controller starts controlling the motor in the first control state immediately before changing the rotation ratio, when changing the rotation ratio, or immediately after changing the rotation ratio.

25. The human-powered vehicle control device according to claim 12,
wherein the controller increases the assist force in a stepped manner in the first control state at timings including at least two of immediately before changing the rotation ratio, when changing the rotation ratio, and immediately after changing the rotation ratio.

26. The human powered vehicle control device according to claim 1, wherein
the controller determines that the request for operating the transmission is received based on an input of the shift-up signal or the shift-down signal from an operation unit operated by an operator of the human-powered vehicle.

* * * * *